(12) United States Patent
Massey et al.

(10) Patent No.: US 8,098,210 B2
(45) Date of Patent: Jan. 17, 2012

(54) ANTENNA MATCHING IN VIDEO RECEIVERS

(75) Inventors: Peter J. Massey, Horley (GB); Kevin R. Boyle, Horsham (GB); Didier Lohy, Cambes en Plaine (FR); Eric Maurice, Caen (FR)

(73) Assignee: EPCOS AG, Munich (DE)

( * ) Notice: Subject to any disclaimer, the term of this patent is extended or adjusted under 35 U.S.C. 154(b) by 1348 days.

(21) Appl. No.: 11/575,067

(22) PCT Filed: Sep. 8, 2005

(86) PCT No.: PCT/IB2005/052931
§ 371 (c)(1),
(2), (4) Date: Mar. 9, 2007

(87) PCT Pub. No.: WO2006/027752
PCT Pub. Date: Mar. 16, 2006

(65) Prior Publication Data
US 2008/0055168 A1    Mar. 6, 2008

(30) Foreign Application Priority Data
Sep. 9, 2004  (EP) ..................................... 04300585

(51) Int. Cl.
*H01Q 1/50* (2006.01)
(52) U.S. Cl. ........ 343/861; 343/702; 343/703; 343/822; 343/860; 333/32; 333/124; 455/77; 455/107; 455/193.1

(58) Field of Classification Search ................. 455/3.02, 455/13.1, 66.1, 73, 77, 88, 101, 103, 107, 455/127.4, 129, 324, 552.1, 553.1, 121, 124.4, 455/193.1, 269; 375/219, 285, 295, 296, 375/347; 343/702, 822, 850, 852, 853, 860, 343/703, 723, 745, 823, 854, 861, 868; 330/282; 333/17.3, 32, 124; 370/310, 314, 321, 326, 370/337, 345, 347
See application file for complete search history.

(56) References Cited

U.S. PATENT DOCUMENTS

| | | | |
|---|---|---|---|
| 6,961,368 B2 * | 11/2005 | Dent et al. | 375/219 |
| 7,132,989 B1 * | 11/2006 | Poilasne | 343/745 |
| 7,157,952 B2 * | 1/2007 | Avants et al. | 327/276 |
| 7,747,226 B2 * | 6/2010 | Dunko | 455/90.3 |
| 2001/0039198 A1 | 11/2001 | Onishi et al. | |
| 2002/0055338 A1 | 5/2002 | Greverie et al. | |
| 2002/0059614 A1 | 5/2002 | Lipsanen et al. | |
| 2002/0101907 A1 | 8/2002 | Dent et al. | |
| 2003/0193997 A1 | 10/2003 | Dent et al. | |

(Continued)

FOREIGN PATENT DOCUMENTS
EP    0 595 406 A1    5/1994
(Continued)

*Primary Examiner* — Anthony Addy
(74) *Attorney, Agent, or Firm* — Slater & Matsil, L.L.P.

(57) ABSTRACT

A method of matching a receive-only antenna (60) for use in receiving video signals in which measurements made on a transceiver's antenna (14) when in an transmitting mode are used in matching the receive-only antenna. The ratio of the amplitude of the reflected signal to the strength of the transmitted signal strength is used not only in selecting components for matching the transceiver's antenna (14) but also in selecting components for matching the receive-only antenna (60). The ratio may be applied to respective look-up tables (54, 64) for selecting the components to be used in matching the respective antennas.

7 Claims, 4 Drawing Sheets

U.S. PATENT DOCUMENTS

Figure 1:
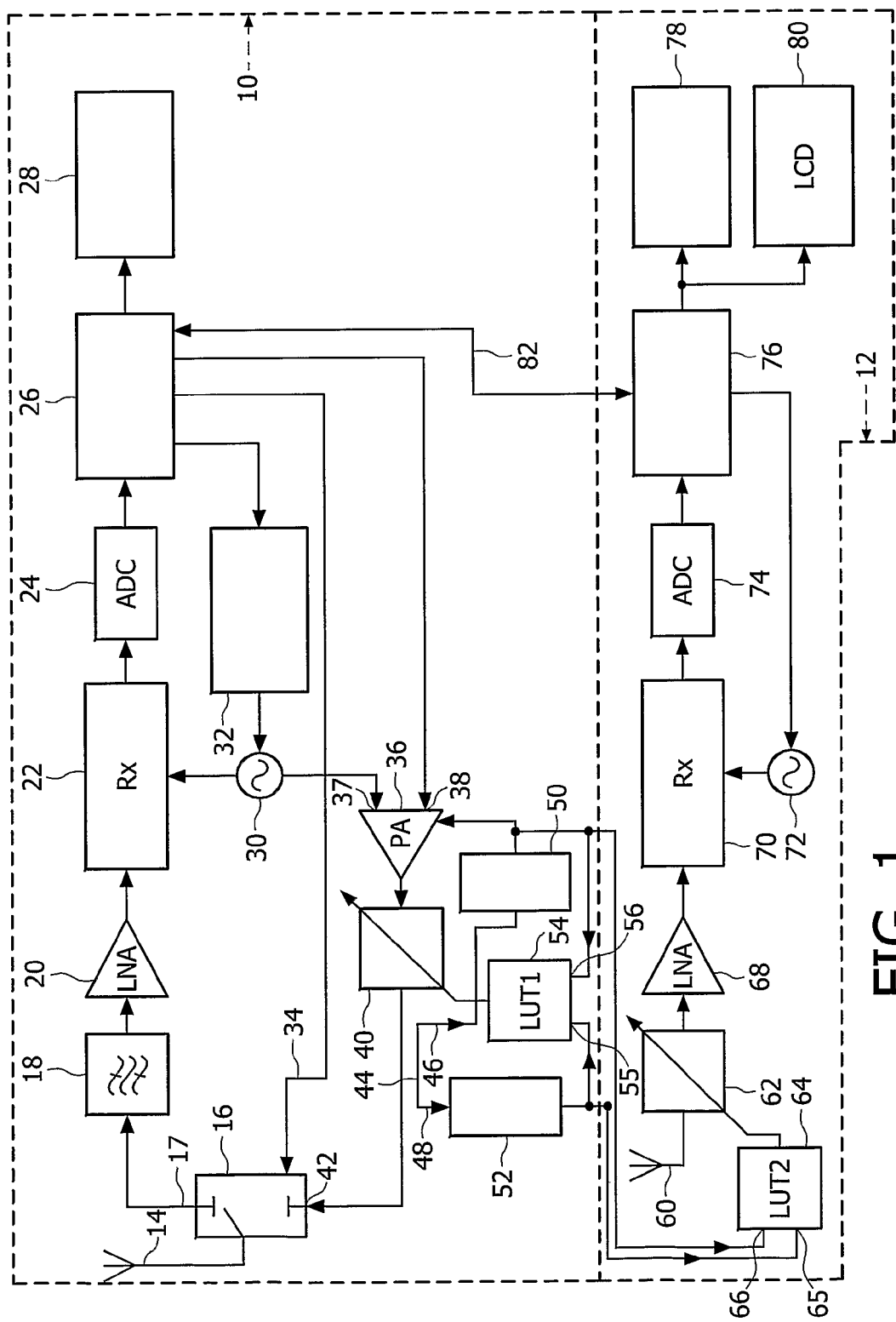

| | | | |
|---|---|---|---|
| 2004/0008151 A1 | 1/2004 | Kurihara | |
| 2005/0245204 A1* | 11/2005 | Vance | 455/80 |
| 2005/0245207 A1* | 11/2005 | Suzuki et al. | 455/101 |
| 2007/0010217 A1* | 1/2007 | Takahashi et al. | 455/121 |
| 2008/0165758 A1* | 7/2008 | Kato et al. | 370/347 |

FOREIGN PATENT DOCUMENTS

| | | |
|---|---|---|
| EP | 0 813 311 A2 | 12/1997 |
| JP | 06-244887 A | 9/1994 |
| JP | 2001-060841 A | 3/2001 |
| JP | 2003-528533 T | 9/2003 |
| JP | 2003-309489 A | 10/2003 |
| JP | 2003-529964 T | 10/2003 |
| JP | 2004-015307 A | 1/2004 |
| WO | WO 01/17255 A1 | 3/2001 |
| WO | WO 01/71940 A2 | 9/2001 |

* cited by examiner

ANTENNA MATCHING IN VIDEO RECEIVERS

The present invention relates to improvements in or relating to antenna matching in video receivers, particularly but not exclusively, digital mobile television receivers (DVB-H) and portable wireless devices, such as mobile phones which include DVB-H.

Currently, the DVB-H standard is the proposed standard for mobile digital TV broadcasts. In order to save power, DVB-H is a time division protocol in which signals are transmitted in one or more predetermined time slots in a succession of time frames. As a consequence the front end of the TV apparatus need only be operating at full power for a portion of the successive time frames. A problem with hand portable apparatus is that their antennas can be detuned by the proximity and position of the hand thereby reducing their efficiency.

Various cost effective solutions for achieving an antenna match in mobile transceivers, such as mobile telephones, are known. As an example US 2003/0193997 discloses a transceiver which may be used in single-band or multi-band embodiments in TDMA and CDMA communication systems. The transceiver comprises a transmitter and a homodyne (or direct conversion) receiver, wherein the receiver is used to process both antenna-received and antenna-reflected signals. During a receive mode, for example, the receiver down-converts antenna-received signals to base band signals, which are then processed to recover received signal information. Then, during a transmit mode, for example, antenna-reflected transmit signals are fed back to the receiver, which is retuned to the desired transmit frequency, and thus down converts the reflected transmit signals to base band signals. These base band signals are then processed to obtain a characterisation of impedance mismatch between the transceiver's transmitter and the associated antenna. An adjustable matching network disposed in the transmit signal path thus may be adjusted based on the characterisation to reduce the mismatch. In this solution there is one antenna which is switched between the receive and transmit modes. There is no teaching of matching of a receive only video signal receiver which is operating in a frequency band different from that or those allocated for use by the transceiver.

An object of the present invention is to match the antenna of a video signal receiver, such as a DVB-H receiver, in a cost effective way.

According to one aspect of the present invention there is provided a method of operating antenna matching in which measurements of reflected signal by a first antenna transmitting a first signal in one frequency band associated with a first transmission system are used in matching a second antenna receiving a second signal in a second frequency band associated with a second transmission system.

The first and second signal transmission systems may be respective time division multiplex (TDM) systems in which signals are transmitted in time slots and the matching of the second antenna may take place during a non-receiving time slot of the second signal.

The first transmission system may be a point-to-point system, such as the GSM (Global System for Mobile Communication) system, and the second transmission may be a point-to multipoint system, such as the DVB-H mobile digital TV broadcast system.

In an embodiment of the method, the strength of the first signal is monitored and the ratio of the measurements of the reflected signal to the strength of the first signal is used in matching the second antenna.

According to a second aspect of the present invention there is provided an apparatus comprising, in combination, a transceiver and a video signal receiver for receiving a video signal in at least one time slot of successive frames, each of the frames comprising a plurality of time slots, wherein the transceiver has a transmitting section controlled to transmit at times when the video signal receiver is not receiving a video signal, a first antenna, measuring means for measuring the magnitude of reflected signal by the first antenna when transmitting, and matching means responsive to at least the magnitude of the reflected signal for matching the transmitting section to the first antenna, and wherein the video signal receiver has a second antenna, an antenna matching network comprising selectable components and means for selecting the components to achieve matching of the second antenna, the means for selecting components being responsive to an output of the measuring means.

The means for selecting the components may comprise a first look-up table and the means for matching the transmitting section to the first antenna may include a second look-up table.

Means may be provided for determining the amplitude of the signal transmitted by the transmitting section and for determining the ratio of the magnitude of the reflected signal to the amplitude of signal transmitted by the transmitting section. The ratio may be used in determining the components to be selected by the antenna matching network and in matching the transmitting section to the first antenna.

Figure 2:
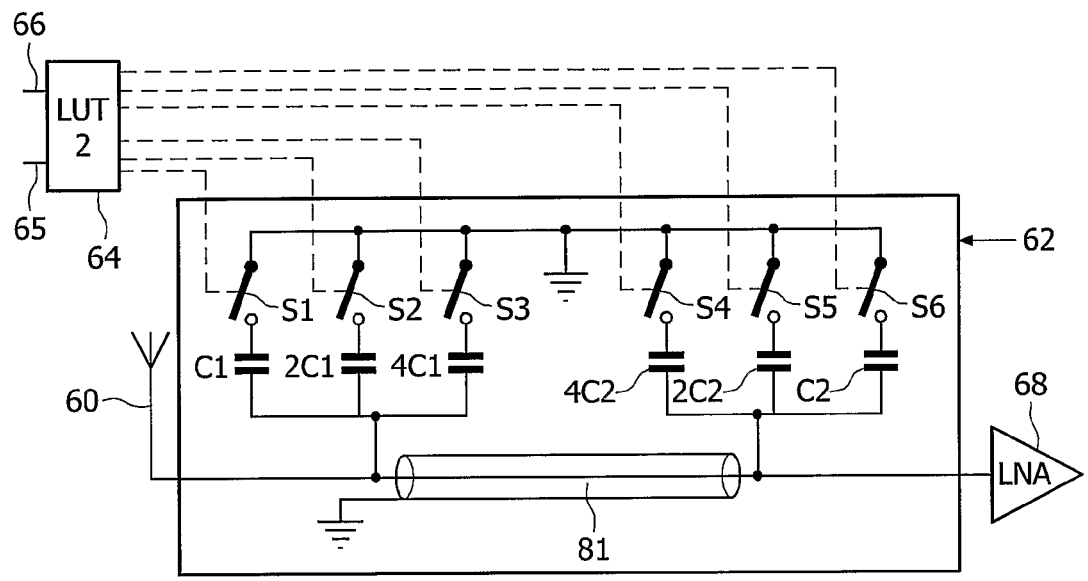
Figure 3:
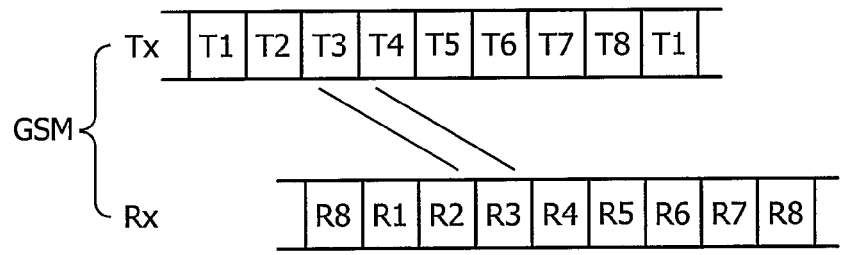
Figure 3:
Figure 4:
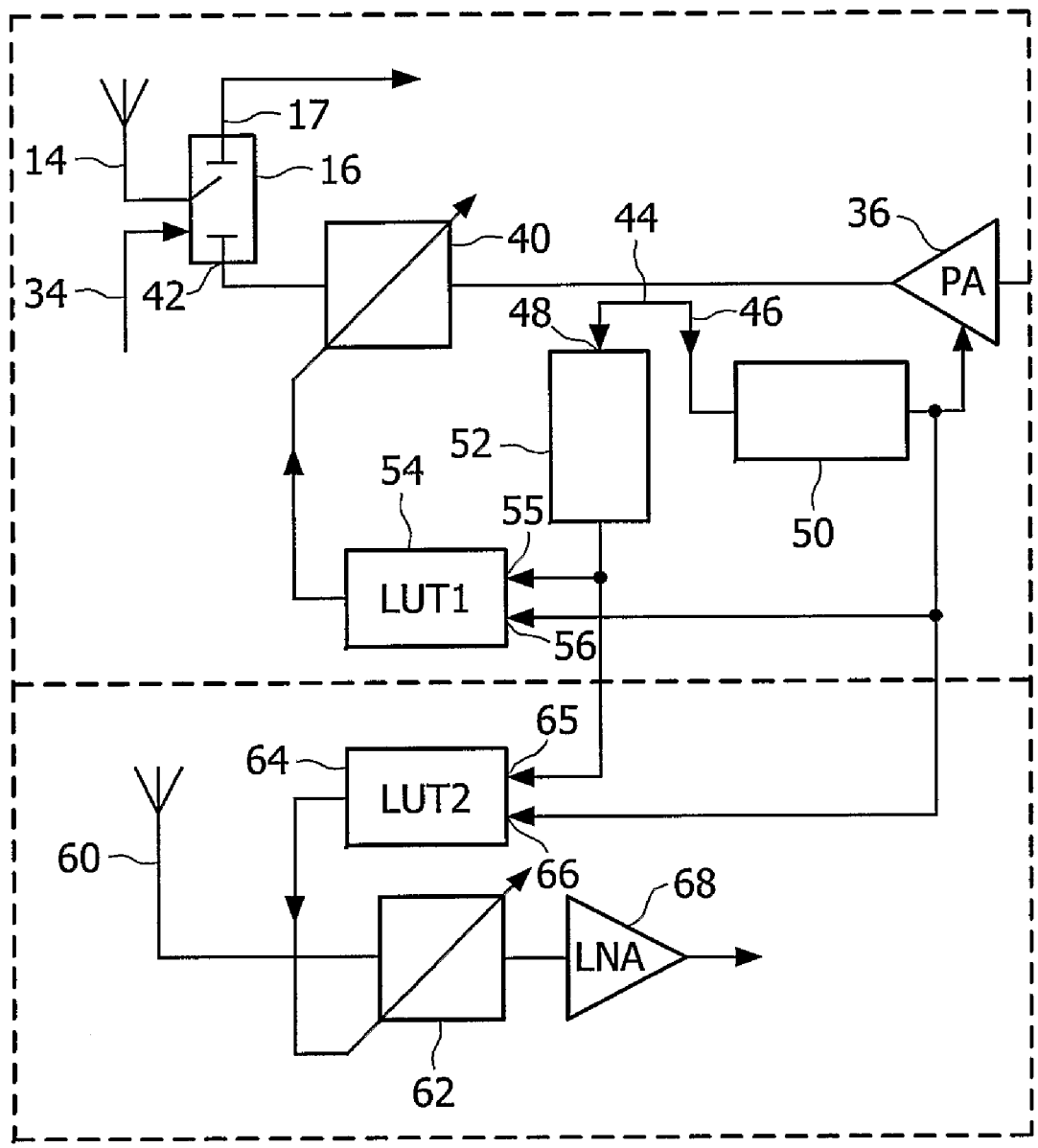
Figure 5:
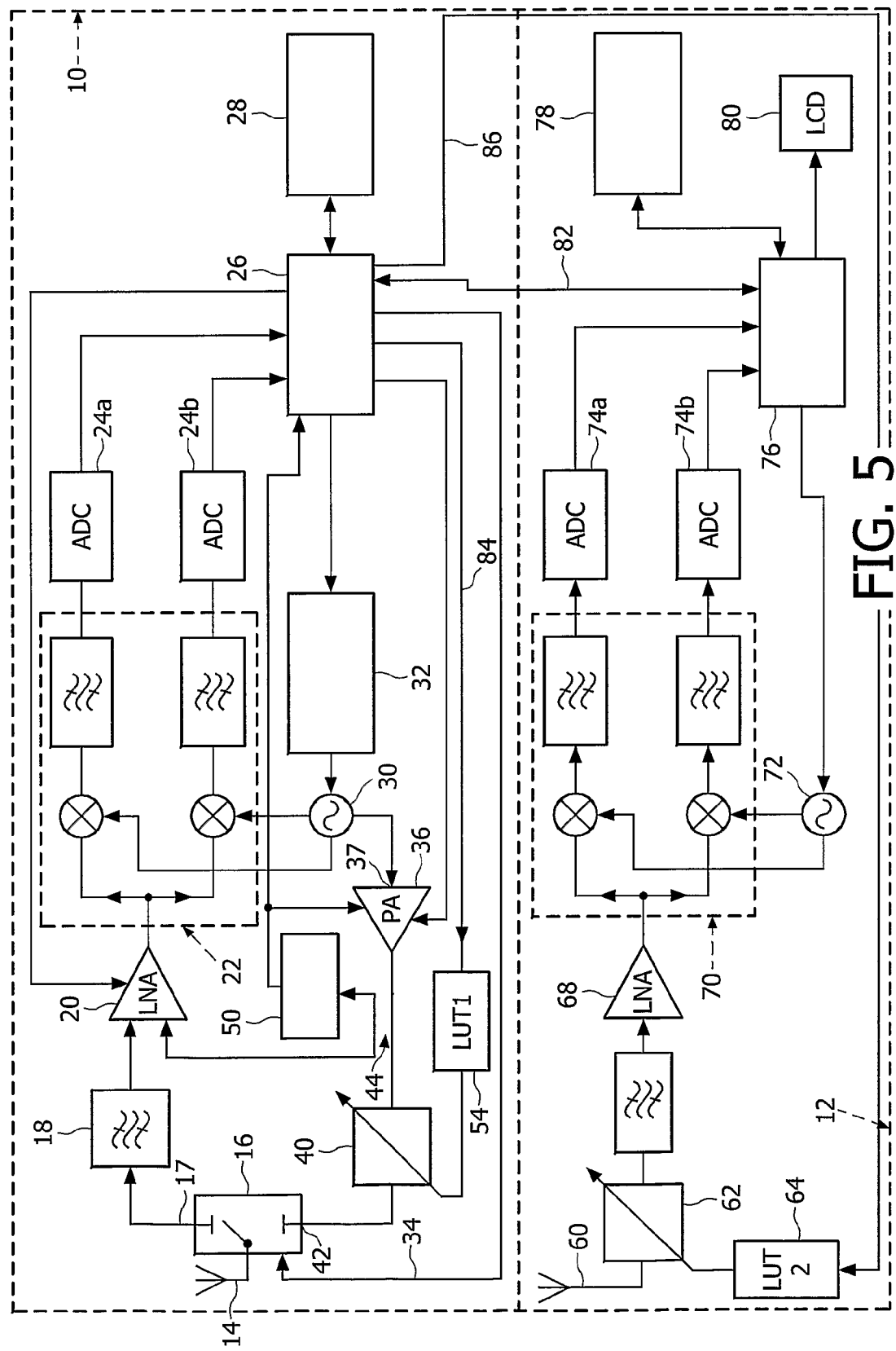

The present invention will now be described, by way of example, with reference to the accompanying drawings, wherein:

FIG. 1 is a block schematic diagram of a first embodiment of the present invention, FIG. 2 is a diagram of an embodiment of a matching filter, FIG. 3 is a timing chart illustrating an implementation of the method in accordance with the present invention, FIG. 4 is a block schematic diagram showing a variant of the first embodiment of the present invention, and FIG. 5 is a block schematic diagram of a second embodiment of the present invention.

In the drawings the same reference numerals have been used to indicate corresponding features.

Referring to FIG. 1, the apparatus comprises a GSM transceiver 10 and a digital video receiver 12, for example a DVB-H receiver.

The GSM transceiver 10 is a TDMA device having a transmitting bandwidth in the range 890 to 915 MHz and a receiving bandwidth in the range 935 to 960 MHz. The operating frequency of the DVB-H system is still under discussion but current speculation is a single channel centred on either 775 MHz or 825 MHz and having a bandwidth of between 8.0 and 24.0 MHz. For the purposes of this invention it is not essential for the DVB-H channel to be close to GSM transmitting band.

The transceiver 10 comprises an antenna 14 coupled to a transmit/receive switch 16 which is controlled by a base band processor 26 which provides switch control signals on a switch control line 34.

A receiver section of the transceiver 10 comprises a bandpass filter 18, which passes signals in the GSM receive frequency range, coupled to an output 17 of the switch 16. A low noise amplifier (LNA) 20 couples the output of the bandpass filter 18 to an input of a receiver 22. The architecture of the receiver 22 may be a superheterodyne, homodyne having a zero IF or low frequency IF or a receiver of any other suitable design. An analogue output of the receiver 22 is digitised by an analog-to-digital converter (ADC) 24 and the result is applied to the base band processor 26 which may be implemented as a digital signal processor (DSP) or an application specific integrated circuit (ASIC). A memory 28 is coupled to the base band processor 26 and serves to store various items such as settings and other control data.

An oscillator 30 provides local oscillator signals to the receiver 22 and modulated signals to a transmitter section of the transceiver 10. A modulatable frequency synthesiser 32, which receives control signals from the base band processor 26, is coupled to the oscillator 30 in order to set the respective channel frequencies generated by the oscillator.

A power amplifier (PA) 36 receives the modulated signals from the oscillator 30 on an input 37 and control signals from the base band processor 26 on an input 38. An antenna matching stage 40 is coupled between an output of the power amplifier 36 and an input 42 of the switch 16. The antenna matching stage 40 is adjustable in order to reduce or eliminate reflected signals from the antenna 14 when in the transmitting mode.

A directional coupler 44 has a first output 46 for sampling the transmitted signal strength. An envelope detector 50 compares the sampled transmitter signal strength with a preset signal envelope and any differences are used to adjust the power output of the PA 36. A second output 48 of the directional coupler 44 is coupled to a reflected signal amplitude measuring stage 52. An output of the amplitude measuring stage 52 and an output of the envelope detector are coupled to inputs 55, 56, respectively, of a first look-up table (LUT 1) 54. The first look-up table 54 stores details of which various combinations of components in the antenna matching stage 40 need to be selected in order to achieve the compensation necessary to rematch the antenna 14 to its current environment. As it is the ratio of the amplitude of the reflected signal to the amplitude of the transmitted signal that is important, the first look-up table 54 may include an input stage for obtaining this ratio from the signals on its inputs 55, 56 or a separate ratio determining stage (not shown) may be provided and its output connected to the first look-up table 54. The various combinations of components to compensate for different degrees of reflection may be determined experimentally or calculated by using a suitable algorithm.

The video signal receiver 12 comprises an antenna 60 coupled by way of an antenna matching stage 62 to an input of a LNA 68. A receiver 70 is coupled to an output of the LNA 68. A local oscillator 72 is also coupled to the receiver 70. The receiver 70 may be of any suitable architecture, such as superheterodyne or homodyne having a zero IF or a low frequency IF. An ADC 74 is coupled to an output of the receiver to digitise the recovered analogue signal and to forward it to a base band processor 76. A memory 78 and an LCD display panel 80 are connected to the processor 76.

The antenna matching stage 62 comprises various combinations of components selectable by a second look-up table (LUT 2) 64 in response to the ratio of the amplitudes of the reflected signal from the antenna 14 and of the transmitted GSM signal applied respectively to inputs 65, 66 of the second look-up table 64. The various combinations of components in the antenna matching stage 62 may be determined experimentally, for example by determining what matching should be applied to the antenna 60 when there is a certain level of signal reflection from the antenna 14, or may be calculated using a suitable algorithm. In a handheld apparatus the antennas 14 and 60 will be located in fairly close proximity to each other so the effects of a user holding the apparatus on these antennas 14, 60 is likely to be similar. Thus the magnitude of signals reflected back into the GSM power amplifier chain may be regarded as an indication of the influence of the hand on the DVB-H signals detected by the video signal antenna 60 and its receiver 70.

Referring to FIG. 2 the illustrated matching filter 62 is a π-filter comprising a series inductance formed by a length of transmission line 81 and shunt capacitors formed by banks of switchable capacitors C1, 2C1, 4C1 and C2, 2C2, 4C2, respectively. Switches S1 to S6 couple each these capacitors to ground in response to a suitable combination of outputs from the look-up table (LUT 2) 64. Thus depending on the ratio of reflected GSM signal to transmitted GSM signal a suitable combination of components can be selected for matching the antenna 60 to the DVB-H receiver.

FIG. 3 illustrates diagrammatically the GSM transmit (Tx) and receive (Rx) channels comprising successive frames of 8 time slots or channels with the receive time slots R1 to R8 being offset or delayed by 3 time slots relative to their associated transmit time slots T1 to T8. Further details of GSM can be obtained from many sources, for example GSM Switching, Services and Protocols, Second Edition, Jörg Eberspächer, Hans-Jörg Vögel and Christian Bettstetter, published by John Wiley & Sons Ltd. A diagrammatic digital video channel Rx12 is illustrated and is assumed to have a Time Division Multiplex (TDM) structure comprising successive frames of N time slots. The receiver 12 receives digital video signals for a predetermined fraction, for example one time slot, of each frame.

In implementing the method in accordance with the present invention the base band processor 26 controls the switching-on of the GSM transmitter in its respective time slot and the base band processor 76 controls the switching-on and -off of the video signal receiver. This latter information is made known to the base band processor 26 by way of a link 82 (FIG. 1). Thus it is possible for the GSM transceiver 10 to be controlled to transmit in a time slot, say time slot T1, which does not coincide with the digital video receiver 12 being energised for its time slot X thereby avoiding blinding the receiver 12.

If desired the functions of the base band processors 26 and 76 may be carried-out by a single processor in which case the memories 28 and 78 may be combined.

FIG. 4 shows a portion of the first embodiment of the present invention shown in FIG. 1 in which the positions of the antenna matching stage 40 and the directional coupler 44 have been switched around. By making this change the envelope detector 50 detects the transmitter power without it being affected by any changes due to matching the antenna 14 and conversely the detected reflected transmitted signal has been altered by the antenna matching stage 40.

Referring to FIG. 5, the second embodiment of the present invention differs from the first embodiment in that the receiver 22 is a homodyne receiver and is used to determine the amplitude and phase of the reflected GSM transmit signal detected by the directional coupler 44. The directional coupler 44 is connected to a second input of the LNA 20. The inputs to the LNA 20 are switchable by the base band processor 26 to select either the GSM receive signal from the band pass filter 18 or the (unfiltered) reflected GSM signal from the directional coupler 44.

The amplitude and phase of the reflected GSM signal is digitised in the ADCs 24a, 24b and is applied to the base band processor 26. An output of the envelope detector 50 is also supplied to the base band processor 26 in which the output is used in generating the ratio of the reflected signal to the transmit signal. This ratio is supplied by a matching control line 84 to the look-up table 54 which selects the components for matching the antenna 14 with the PA 36. The base band processor 26 also generates a matching signal for use by the digital video receiver 12 and this signal is supplied by another matching control line 86 to the look-up table 64 which selects the components in the antenna matching stage 62 for matching the antenna 60 with the receiver 70.

In the interests of brevity the embodiment of FIG. 5 will not be described in greater detail as it will replicate what has been described with reference to, or can be understood from, FIGS. 1 and 4. In FIG. 5 the functions of the base band processors 26 and 76 may be carried-out in a single processor and the memories 28 and 78 may be combined.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of GSM phones and digital video receiving systems and component parts therefor and which may be used instead of or in addition to features already described herein.

The invention claimed is:

1. A method of antenna matching, the method comprising:
measuring a signal reflected by a first antenna transmitting a first signal in one frequency band associated with a first transmission system;
measuring a strength of the first signal;
adjusting a first adjustable antenna matching stage to match the first antenna to its current environment by a first look-up table in response to a ratio of the measurements of the reflected signal to the strength of the first signal; and
adjusting a second adjustable antenna matching stage to match a second antenna receiving a second signal in a second frequency band associated with a second transmission system to its current environment by a second look-up table in response to the ratio of the measurements of the reflected signal to the strength of the first signal.

2. The method as claimed in claim 1, wherein the first and second signals are time division multiplex signals and wherein the second antenna is matched in a non-receiving time slot of the second signal.

3. The method as claimed claim 1, wherein the first transmission system is a point-to-point system and the second transmission system is a point-to-multipoint system.

4. An apparatus comprising:
a transceiver; and
a video signal receiver for receiving a video signal in at least one time slot of successive frames, each of the frames comprising a plurality of time slots;
wherein the transceiver comprises:
a transmitting section controlled to transmit a first signal at times when the video signal receiver is not receiving a video signal;
a first antenna;
a measurement circuit configured to measure a magnitude of a signal reflected by the first antenna when transmitting; and
a matching circuit responsive to at least a ratio of the magnitude of the reflected signal to an amplitude of the first signal for matching the transmitting section to the first antenna, wherein the matching circuit comprises a second look-up table; and
wherein the video signal receiver comprises:
a second antenna receiving a second signal;
an antenna matching network comprising selectable components; and
a selection circuit configured to select the components to achieve matching of the second antenna, wherein the selection circuit comprises a first look-up table that is responsive to the ratio of the magnitude of the reflected signal to the amplitude of the first signal.

5. The apparatus as claimed in claim 4, further comprising a determination circuit configured to determine the amplitude of the first signal.

6. The apparatus as claimed in claim 4, wherein the video signal receiver is configured to receive point-to-multipoint signals and the transceiver is a point-to-point apparatus.

7. The apparatus as claimed in claim 4, wherein the first and second signals are time division multiplex signals, and wherein the selection circuit is configured to match the second antenna in a non-receiving time slot of the second signal.

* * * * *